United States Patent [19]

Beere et al.

[11] Patent Number: 4,614,469

[45] Date of Patent: Sep. 30, 1986

[54] MULTIPLE COLLET WORK-PIECE HOLDER

[76] Inventors: Richard F. Beere, 27234 Washington Ave., Waterford, Wis. 53185; Harry N. Christensen, 3019 Olive St., Racine, Wis. 53403

[21] Appl. No.: 645,866

[22] Filed: Aug. 31, 1984

[51] Int. Cl.[4] .............................................. B23B 31/30
[52] U.S. Cl. ........................................ 409/219; 279/4; 409/903
[58] Field of Search ................. 409/219, 903, 223; 279/4, 41 A, 46 A, 41 R, 46 R; 82/3, 40 R

[56] References Cited

U.S. PATENT DOCUMENTS

| | | | |
|---|---|---|---|
| 2,393,458 | 1/1946 | Cook | 279/4 |
| 2,731,952 | 1/1956 | Szabo | 279/4 |
| 2,988,942 | 6/1961 | Garberding | 279/4 |
| 3,087,736 | 4/1963 | Lukas | 279/4 |
| 3,143,356 | 8/1964 | Pray | 279/4 |
| 3,632,122 | 1/1972 | Sessody | 279/4 |
| 4,011,777 | 3/1977 | McConnell | 279/4 |
| 4,103,589 | 8/1978 | Francis | 279/4 |

FOREIGN PATENT DOCUMENTS 2379351 10/1978 France .................................. 279/4

Primary Examiner—Gil Weidenfeld
Assistant Examiner—Daniel W. Howell
Attorney, Agent, or Firm—Arthur J. Hansmann

[57] ABSTRACT

A multiple collet work-piece holder having a block with a plurality of openings and a collet retainer disposed within the openings. The retainer has pistons which are subjected to hydraulic pressure for moving the collet to a clamping position. The opposite ends of the collet are completely free from any obstructions, so the work-piece can be inserted from either end, and the collet is securely held against rotation so that the work-piece can be machined as desired. Also, an automatic release of the collet is provided, so that the work-piece can be released when fluid pressure is relieved.

2 Claims, 5 Drawing Figures

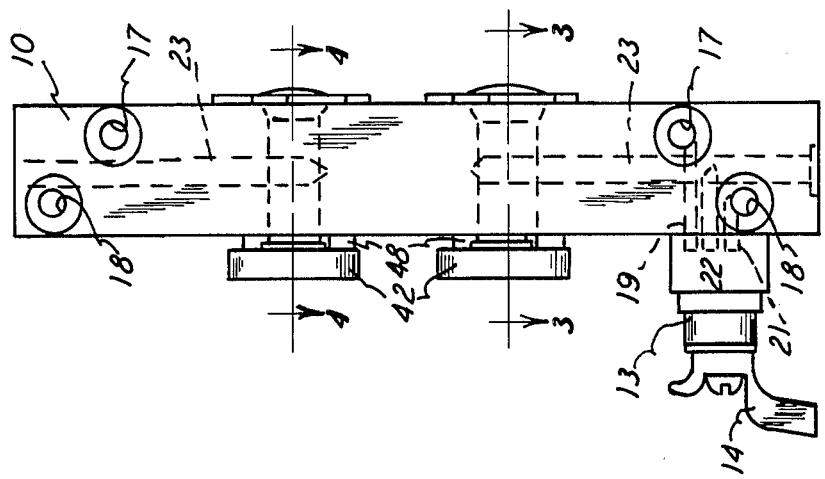
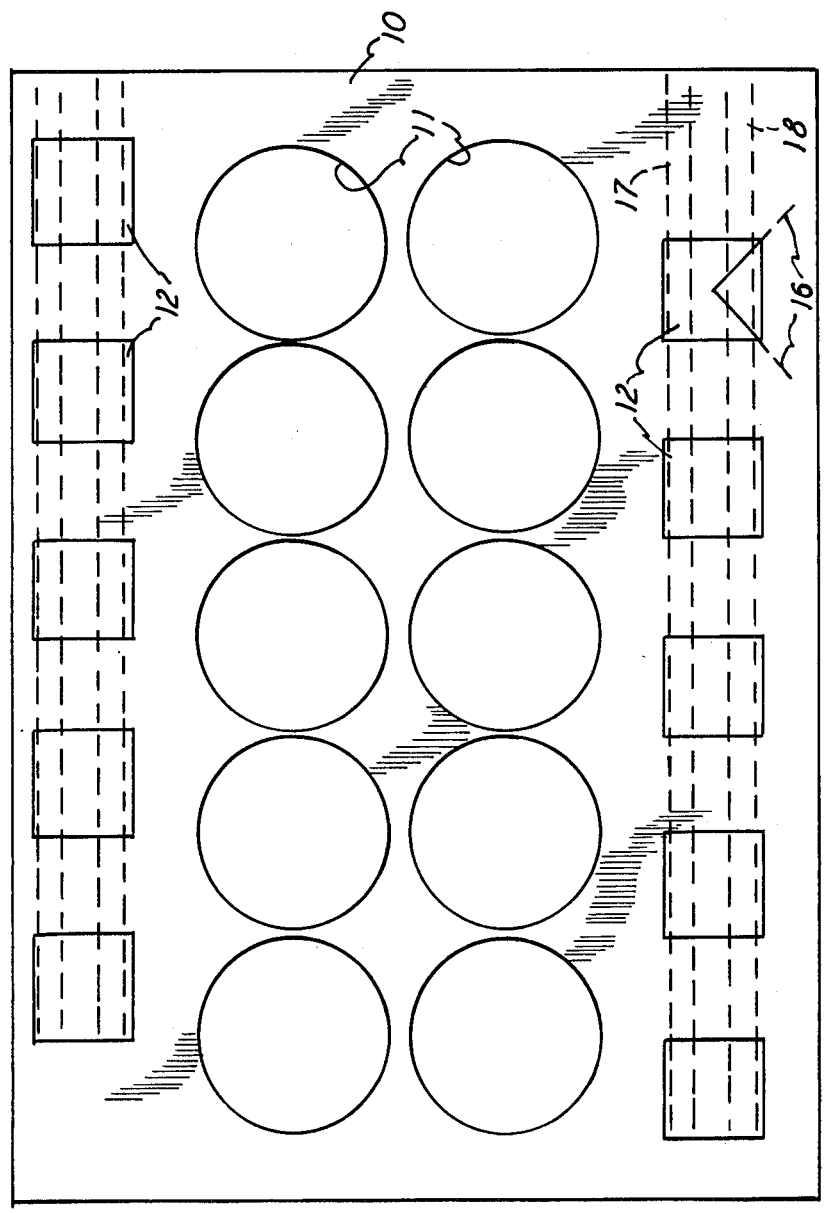

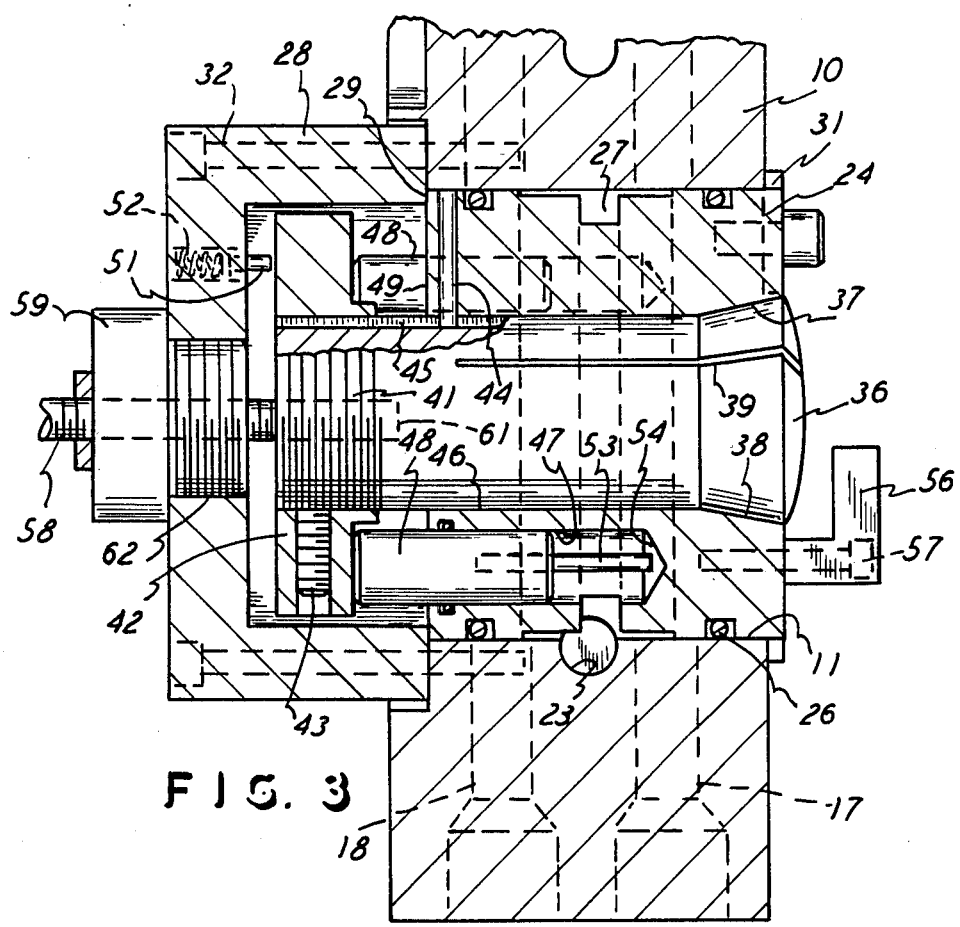
FIG. 3
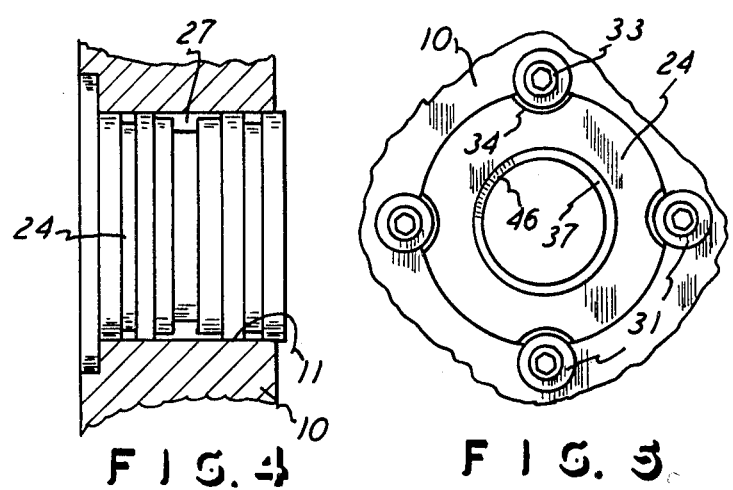
FIG. 4
FIG. 5

MULTIPLE COLLET WORK-PIECE HOLDER

This invention relates to a multiple collet work-piece holder, and it can be referred to as a fixture constituting a machining center where a plurality of work-pieces are presented and held for machining.

BACKGROUND OF THE INVENTION

Multiple collet holders, or fixtures constituting a machining center, are already known in the art. For instance, U.S. Pat. Nos. 3,632,112 and 4,103,589 show multiple collet or spindle chucks or heads. These units present a plurality of work-pieces to a machining tool, and they also utilize hydraulic pressure for clamping the tool in a collet. That is, the hydraulic pressure is applied to axially move the collet, in the usual manner, so that the collet will clamp onto the work-piece.

However, the prior art does not disclose a multiple collet holder wherein each collet is individually held against rotation, so that the machine can be firm and accurate, nor does the prior art disclose the arrangement for individually actuating each collet for clamping and releasing a work-piece. That is, the prior art is aware of only collet holders wherein the collets can rotate and/or the multiple collets are clamped in unison, rather than individually. Still further, the prior art is incapable of having the collet receive the work-piece from either axial end of the collet, and having the work-piece extend beyond the collet.

Further, the present invention improves upon the prior art in that it provides a multiple collet holder wherein the collets can be individually clamped, and the collets are specifically retained against rotation for optimum machining procedures. Additionally, the work-pieces held by the collets of the present invention can be inserted from either end of the collet and can protrude from either end of the collet, and thus long work-pieces can be accomodated by the present invention. Also, the present invention is not susceptible to impairment by dirt, oil, metal chips, and the like which are commonly prevalent in machining.

BRIEF DESCRIPTION OF THE DRAWINGS

FIG. 1 is a front elevational view of a base block of this invention.

FIG. 2 is a side elevational view of FIG. 1, with parts added thereto.

FIG. 3 is an enlarged sectional view taken along the lines 3—3 of FIG. 2, and with parts added thereto.

FIG. 4 is a sectional view taken along the lines 4—4 of FIG. 2, and with parts removed therefrom.

FIG. 5 is an end elevational view of FIG. 4.

DETAILED DESCRIPTION OF THE PREFERRED EMBODIMENT

FIGS. 1 and 2 show a block 10 having a plurality of openings 11 extending therethrough, and a total of ten openings 11 is shown, but any plurality could be used. A like number of valve pads or mounting locations 12 is also shown, and it will be understood that there is one location 12 for each opening 11. FIG. 2 shows a conventional type of valve 13 located on one of the pads 12, and there is a valve handle 14 which can be rotated, such as within the angulation designated 16 in FIG. 1. Thus, each opening 11 has a valve 13 of a conventional construction, and each valve is suitably mounted on the block 10 and controls fluid-flow to each of the openings 11, in a manner described later.

FIG. 2 shows a fluid pump passageway 17 and a fluid tank passageway 18 extending into the block 10 on the side thereof, and there is an additional fluid passageway 19 extending between the passageway 17 and the valve 13 and is there is an additional fluid passageway 21 extending between the passageway 18 and the valve 13. Also, there is a fluid passageway 22 extending from the valve 13 and to a fluid passageway 23 extending upwardly in the block 10 and communicating with an opening 11. That is, each valve 13 and each opening 11 has the set of passageways 19, 21, 22, and 23, and the passageways 17 and 18 extend along the entire block 10 to flow communicate with each set of the four passageways just mentioned. In this arrangement, the main passageways 17 and 18 service to and extend to each of the sets of passageways communicating between the valve 13 and the openings 11. In that respect, the fluid pressure is controllable to each individual opening 11.

FIG. 3 shows a fragment of the block 10 and one of the openings 11, and there is a collet retainer 24, of a cylindrical construction, disposed within the cylindrical opening 11 and it is fluid tight therein, such as by means of the O-rings 26 shown therein. The retainer 24 also has a groove 27 extending endlessly therearound and in fluid-flow communication with the fluid passageway 23.

The retainer 24 is axially fixed in the block 10 by means of a cap 28 extending over the block edge 29, and also by means of several washers 31 extending over the right-hand edge of the retainer 24. The cap 28 is secured to the block by means of screws 32, and the several washers 31, such as shown in FIG. 5, are secured to the block by means of screws 33, and the washers 31 nest in circular recesses 34 formed in the circumference of the retainer 24. With that arrangement the retainer 24 cannot move to the right, as viewed in FIG. 3, nor can the retainer 24 rotate about its longitudinal axis. Therefore, machining can be done without the retainer 24 moving in any direction at all.

A collet 36 of a cylindrical type and having its longitudinal axis co-axial with the axis of the retainer 24, is disposed within the retainer 24. The retainer 24 has a conical surface 37 which mates with the collet conical surface 38, in the usual arrangement of receiving a collet and for the usual purpose of having the collet conventional split 39 compressed to retain a work-piece which would be disposed within the collet. That is, when the collet 36 is moved to the left, as viewed in FIG. 3, it would clamp upon a work-piece which is not shown but which would normally be received longitudinally within the collet 36 in the conventional manner.

The collet 36 has a threaded end 41 which receives a collar 42 secured thereto by means of a set screw 43. The collar serves as a lateral projection relative to the longitudinal axis of the collet 36, as shown. Also, a pin 44 is imbedded in the retainer 24 and extends downwardly into the retainer cylindrical opening 46 which is receiving the collet 36, as shown. The collet has a longitudinal groove 45 which receives the end of the pin 44, and, with that arrangement, the collet 36 is secured against rotation relative to the retainer 24, but the collet can slide left and right relative to the retainer 24.

The retainer 24 is also a piston retainer and it has several piston bores 47 disposed in positions axially parallel with the longitudinal axis of the retainer 24. Pistons 48 are slidably disposed in the openings 47 and extend beyond the retainer face 49 to abut the collar 42, as shown in FIG. 3. Through the fluid passageways 23 and the retainer grooves 27, the piston bores 47 are in fluid-flow communication with the fluid pressure in the pump lines 17. Thus, the pistons 48 are pressurized to move leftwardly, as viewed in FIG. 3, and press against the collet collar 42 to thereby squeeze the collet inwardly at its surface 38 for clamping onto a work-piece disposed within the collet 36.

Releasing plungers 51 extend from the cap 28 and project to the collar 42. Compression springs 52 engage the plungers 51 to urge the plungers 51 against the collar 42 and move thereby the collar 42 to the right, as viewed in FIG. 3, and this is accomplished when the hydraulic pressure is relieved in the piston bores 47, and then the work-piece held by the collet 36 is released since the collet is actually moved rightward also. Further, to control the amount of rightward movement, the pistons 48 have stop pins 53 connected therewith and extend to the piston bore base 54. Also, the stops or locators 53 position the pistons 48 leftwardly in the bores 47, as viewed in FIG. 3, to thereby assure that the pistons 48 are in position for hydraulic pressurizing, as mentioned.

Work-piece stops may be applied at opposite ends of the collet 36, and one such stop 56 is shown connected by means of a bolt 57 to the retainer 24, and the stop 56 extends into a position which would abut a work-piece positioned in the collet 36 and extending to the stop 56. Also, an adjustable stop 58 is mounted on the other end by means of extending through a threaded retainer 59. The inner end 61 of the stop 58 extends along the axis of the collet 36 and into the collet 36 and is available for serving as a stop for a work-piece inserted from the right side, as viewed in FIG. 3. The holder or adapter 59 can of course be removed from the cap 28 since it is threaded therein at 62, and of course it would be removed when the work-piece is to be inserted from the left side, as viewed in FIG. 3.

With this arrangement, the individual collets 36, being shown as ten in all, can be separately and individually utilized for holding a work-piece, since there is a separate valve 13 for each retainer 24 with its collet 36. Also, except for the stops 56 and 58 which can be selectively used and which would be used alternately, the work-piece can be of a long length and can be inserted from either the right or the left and sides, and there is no obstruction from either side. Additionally, the retainers 24 are securely held against rotation by means of the washers 31, and the collets 36 are likewise held against rotation relative to the retainers 24, by means of the pin 44. The cap 28 serves to preclude entry of foreign matter into the interior of the fixture, and the relief plungers 51 are employed for automatic release of the collet 36, though the total left and right stroke of the collet 36 is restricted, both by means of the plunger 51 and the piston stops 53. Still further, with the basic block 10 employed as disclosed herein, retainers 24 of various interior opening sizes 46 can be readily positioned within the block openings 11 and thereby hold collets 36 of varying sizes. These features permit complete versatility for clamping a work-piece in a non-rotated and extremely accurate position for the machining processes desired.

What is claimed is:

1. A multiple collet work-piece holder, comprising a block having plurality of openings therein and having first fluid passageways separately extending to said openings at a location on each of said openings, a collet retainer disposed in each of said openings and having an axial opening therethrough, fluid seals extending between said retainer and said block on both sides of said location for fluid sealing fluid flow in said openings, each of said retainers having a fluid passageway therein forming a fluid flow passageway from said location to the interior of said retainers and presenting a plurality of cylindrical bores in said retainers, connecting means extending between each of said retainers and said block for preventing rotation of said retainers in said openings, a fluid piston movably disposed in each of said cylindrical bores in said retainers and exposed to fluid pressure in said bores and having a piston reciprocating line of movement which is parallel to said axial opening, a collet disposed in each said axial opening and having a work-piece receiving opening therein co-axial with said axial opening for receiving a work-piece to be clamped by said collet, a connector extending between said retainer and said collet for non-rotational movement therebetween while allowing axial movement of said collet relative to said retainer, a projection affixed to said collet and in contact with said pistons for clamping said collet upon axial movement of said pistons in response to fluid pressure in said fluid passageways, release means interposed between said projection and said block for releasing said collet from clamping the work-piece, and a fluid valve operative on each said first fluid passageway for separately controlling fluid pressure at said piston and thereby separately clamp each of said collets.

2. The multiple collet work-piece holder as claimed in claim 1, including said block having a main fluid passageway extending therethrough, said first fluid passageways being in fluid-flow communication with said main fluid passageway and separately extending to said block openings, and said fluid valve connected with each of said first fluid passageways being separately operable for separately controlling fluid pressure to each of said openings.

* * * * *